United States Patent [19]

Wild

[11] 4,329,542
[45] May 11, 1982

[54] CIRCUIT ARRANGEMENT FOR AN ELECTRONIC D.C. TELEGRAPH TRANSMITTER

[75] Inventor: Alfred Wild, Munich, Fed. Rep. of Germany

[73] Assignee: Siemens Aktiengesellschaft, Berlin & Munich, Fed. Rep. of Germany

[21] Appl. No.: 156,205

[22] Filed: Jun. 3, 1980

[30] Foreign Application Priority Data

Jun. 26, 1979 [DE] Fed. Rep. of Germany ....... 2925747

[51] Int. Cl.³ .................... H04L 25/02; H04M 3/00
[52] U.S. Cl. ................................ 178/69 R; 179/16 F
[58] Field of Search .................. 178/3, 69 R; 323/15; 179/16 F

[56] References Cited

U.S. PATENT DOCUMENTS

| | | | |
|---|---|---|---|
| 2,962,554 | 11/1960 | Vigren | 179/16 F |
| 3,922,487 | 11/1975 | Giebler | 178/69 R |
| 4,166,196 | 8/1979 | Rademaker | 178/3 |

FOREIGN PATENT DOCUMENTS 1266353 3/1972 United Kingdom .
1452158 10/1976 United Kingdom .

*Primary Examiner*—Thomas A. Robinson
*Attorney, Agent, or Firm*—Hill, Van Santen, Steadman, Chiara & Simpson

[57] ABSTRACT

An electronic d.c. telegraph transmitter comprises a transmitting keying circuit and a current regulating circuit which operates in accordance with the principle of a continuous regulator and serves to maintain the line current constant. The power loss which is converted into heat is as small as possible. Between the current regulating circuit and the telegraph battery, a switching stage connects only one tap of the telegraph battery to the input of the current regulating circuit. The voltage present at the input of the current regulating circuit is automatically increased or reduced in stepped fashion in dependence upon the transmitting voltage which occurs on the transmission line.

4 Claims, 3 Drawing Figures

CIRCUIT ARRANGEMENT FOR AN ELECTRONIC D.C. TELEGRAPH TRANSMITTER

BACKGROUND OF THE INVENTION

1. Field of the Invention

The present invention relates to a circuit arrangement for an electronic d.c. telegraph transmitter which includes a transmitting keying circuit, a current regulating circuit which operates in accordance with the principle of a continuous regulator and which serves to maintain a constant current on the transmission line, and a telegraph battery, wherein the transmitting keying circuit connects the telegraph battery to the transmission line in the timing of the binary data signals.

2. Description of the Prior Art

In existing telegraph and data networks the signalling and data exchange takes place on the connection lines by means of d.c. telegraph transmitters of high transmitting voltage. The subscribers are connected to the exchanges or the repeaters via duplex four-wire double current lines (e.g. ±60 V, ±20 mA) or semi-duplex two-wire single current lines (e.g. 120 V, 40 mA). In certain cases the subscribers are connected via duplex four-wire single current lines (e.g. 120 V, 40 mA).

Since the subscribers are connected to the exchange via connection lines of various types and lengths, an extension line resistor must be manually set for each subscriber. Arrangements for an electronic d.c. telegraph transmitter are already known in which the current prevailing on the connection line, the so-called line current, is maintained at a constant value by means of automatic regulating devices. This automatic regulating device can either replace the conventional extension line resistor, or can be advantageously connected between the telegraph battery and the transmitting keying circuit which keys the connection line.

A known circuit which maintains the line current constant operates in accordance with the principle of the continuous regulator. Here, independently of the line length or the resistance of the transmission line, the so-called loop resistance, the current consumed remains constant. The power which is not emitted to the connection line is converted into heat in the regulating circuit. Because of the large extension line resistance, this is particularly great in the case of short line lengths and in the event of a short circuit. Therefore, when an electronic d.c. telegraph transmitter is constructed in a modern integrated space saving circuitry technique, additional measures are required to discharge the power loss which has been converted into heat. Therefore, it is necessary, on the one hand, to provide large surface cooling bodies and on the other hand substantial air cavities which results in a sizeable space requirement.

In order to reduce the power loss, in electronic d.c. telegraph transmitters, it is also known to maintain the line current constant by using regulating circuits which operate in accordance with the principle of the switching regulator. This represents a keyed current regulation wherein a measuring device measures the magnitude of the line current and, in dependence upon the deviation of the actual value from the theoretical value, controls the keying ratio of an additionally keying contact. The keying necessitates a smoothing of the output current. This known regulating circuit involves the disadvantage that a higher expense is incurred due to the additional keying arrangement and difficulties occur in the requisite smoothing of the output current. Therefore, a filter choke is additionally required.

SUMMARY OF THE INVENTION

The object of the present invention is to provide an electronic d.c. telegraph transmitter which operates with a current regulating circuit in accordance with the principle of the continuous regulator and wherein the maximum occurring power loss is substantially reduced.

The above object is realized by the features of the invention in that the telegraph battery possesses a plurality of taps, only one tap being connected via a switching stage to the current regulating circuit, that a voltage threshold value stage is provided which compares the transmitting voltage which occurs on the transmission line with a voltage threshold value and, in dependence upon the comparison, controls the switching state in such manner that when the transmitting voltage undershoots the voltage threshold value a tap of the telegraph battery is connected with a higher voltage value, and when the transmitting voltage overshoots the voltage threshold value a tapping of the telegraph battery is connected with a lower voltage value.

The basic principle of the present invention is that the voltage present at the input of the current regulating circuit, which operates in accordance with the principle of a continuous regulator, is automatically increased or reduced in a stepped fashion in dependence upon the line length and the loop resistance. This realization has the advantage that the maximum occurring power loss is substantially reduced so that measures for discharging the power loss which is converted into heat are either dispensed with or considerably simplified. The use of the current regulating circuit in accordance with the principle of the continuous regulator necessitates a substantially smaller expense as additional filtering and smoothing means, and likewise a keying circuit, are not needed. The realization permits a particularly advantageous, economical construction of the electronic d.c. telegraph transmitter in a modern integrated circuit technique with the smallest possible space requirement. As the automatic voltage transfer takes place without delay, and, thus, before the regulating circuit reaches the regulating limit, apart from the static properties, the dynamic properties of a transmitting circuit are retained with a constant input voltage in the current regulating circuit. This realization is advantageously suitable for d.c. telegraph transmitters featuring single current keying or double current keying.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
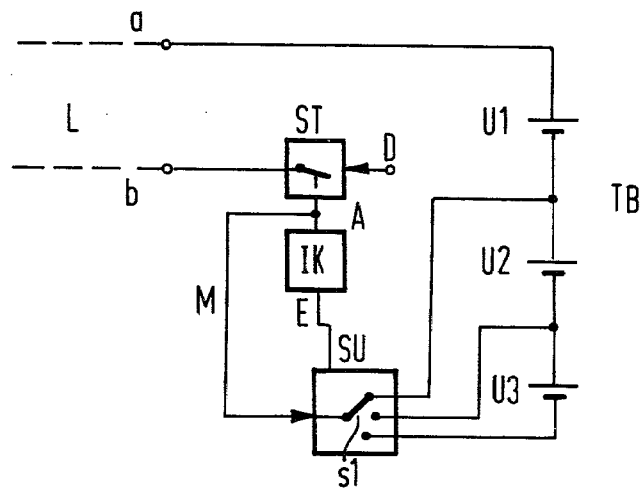
FIG. 1 shows a fundamental circuit diagram of the electronic d.c. telegraph transmitter in accordance with the invention.

FIG. 1 fundamentally illustrates the new realization. The electronic d.c. telegraph transmitter consists of the transmitting keying circuit ST, the current regulating circuit IK, the telegraph battery TB with the subvoltages U1, U2 and U3 and the switching stage SU. Depending upon the position of a switching contact s1, the switching stage SU switches through either the subvoltage U1 or the subvoltages U1+U2 or U1+U2+U3 to an input E of the current regulating circuit which operates in accordance with the principle of a continuous regulator. At the output of the current regulating circuit there occurs a constant current which is fed to the transmitting keying circuit ST which itself connects the output A of the regulating circuit to the wire b of a transmission line L via a drive line D in the timing of the data elements which are to be transmitted or dialled, and switching criteria. In simple terms, the transmitting keying circuit can be considered as a switch which selectively either connects or disconnects the output of a regulating circuit IK to/from the wire b of the line L. The practical construction of the transmitting keying circuit ST and the current regulating circuit IK is known per se and does not constitute the subject of this invention. In this exemplary embodiment, the common pole for the voltages of the telegraph battery TB which are switched through by the switching stage SU is directly connected to a wire a of the line L. In practical operation, surge voltage protection circuits in the event of grounding can also be interposed. In the described exemplary embodiment, a line M can also be connected to the wire b of the line L following the transmitting keying circuit. However, the transmitting keying circuit can also be connected into the wire a of the Line L so that the output A of the current regulating circuit IK would be directly connected to the wire b of the line L. Advantageously, it is also possible to combine the transmitting keying circuit with the current regulating circuit so that merely one stage is provided. At the output A of the current regulating circuit IK the voltage on the transmission line is measured and, in dependence thereupon, the contact s1 of the switching stage SU is switched over. In the illustrated state, the switching stage SU switches through the voltage U1 of the telegraph battery TB to the regulating circuit. The voltage present at the output A of the current regulating circuit, which is identical to the voltage prevailing on the line L, controls the contact s1 via the line M. When a specific threshold value set in the switching stage SU is overshot by the voltage at the output A of the current regulating circuit, the contact s1 is reversed. In the case of short lines which possess a small loop resistance the voltage drop on the line L is small so that the voltage threshold value set in the switching stage SU is not overshot; the contact s1 remains in the illustrated position. In the event of larger loop resistances, the voltage on the line L increases, the threshold value in the switching stage SU is overshot, and the switching contact s1 is switched into the next switching position so that the subvoltages U1+U2 are connected to the input E of the regulating circuit IK. In the event of even greater loop resistances, a second higher voltage threshold value is overshot so that the switching contact s1 is stepped by one position and, thus, the sum of the subvoltage U1+U2+U3 is connected to the input E of the current regulating circuit IK. When the individual threshold values are undershot, the switching contact s1 is switched back, in stepped fashion, into the illustrated starting position. A sufficient number of subvoltages are connected and disconnected to ensure that the regulating circuit IK operates reliably within the regulating range.

The transfer to the various subvoltages takes place without delay, so that when the transmitting voltage reaches the relevant voltage threshold value, the transfer is accompanied by immediate dynamic matching.

Figure 2:
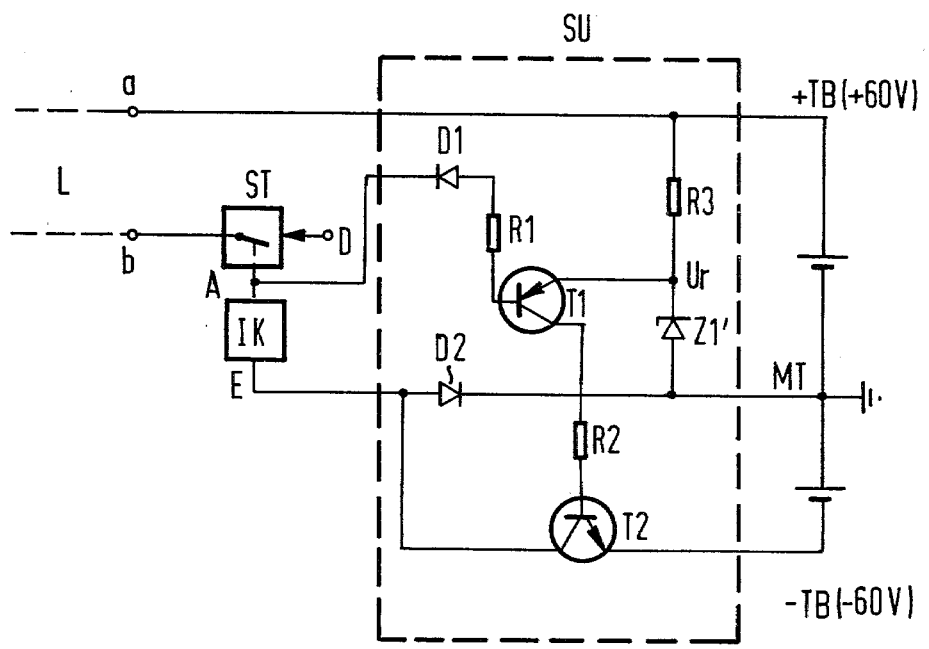
FIG. 2 illustrates an advantageous exemplary embodiment of an electronic d.c. telegraph transmitter featuring single current keying.

FIG. 2 illustrates an exemplary embodiment of an electronic d.c. telegraph transmitter featuring single-stage voltage transfer facilities. The circuit illustrates the modules which are known per se and have already been illustrated and explained with reference to FIG. 1, namely the transmitting keying circuit ST and the current regulating circuit IK. The telegraph battery comprises two subvoltages +TB (+60 V) and −TB (−60 V) and the grounded center MT of the battery. The telegraph battery is merely to represent an example; it is possible to use any other voltage source. The switching stage SU comprises a transistor T1 and a transistor T2, a pair of diodes D1, D2, a Zener diode Z1' and a plurality of resistors R1, R2 and R3. The voltage threshold value Ur is formed by the Zener voltage of the Zener diode Z1'. The positive pole +TB (+60 V) of the telegraph battery is permanently connected to the wire a of the line L.

For such time as the voltage present at the output A of the regulating circuit IK is more positive than the voltage threshold value Ur which corresponds to the Zener voltage of the Zener diode Z1', the transistor T1 and, therefore, also the transistor T2 is blocked. The center MT of the telegraph battery is connected by way of the conductive diode D2 to the input E of the current regulating circuit IK. If, however, the voltage at the output A of the regulating circuit IK falls below the voltage threshold value Ur, the transistor T1 is rendered conductive. The conductive switching transistor T1 likewise brings the switching transistor T2 into the conductive state. The transistor T2 switches through the negative pole −TB (−60 V) of the telegraph battery to the input E of the current regulating circuit IK. The diode D2 is blocked and decouples the center MT of the telegraph battery from the current regulating circuit. In this case, the current regulating circuit IK is supplied with the entire voltage of the telegraph battery which amounts to 120 V.

If the voltage present at the output A of the regulating circuit IK exceeds the threshold value Ur, the transistor T1 is brought into the blocked state. The diode D1 is then blocked and decouples the transistor T1 from the transmission line L. The transistor T1 then likewise brings the transistor T2 into the blocked state. As a result the negative pole −TB of the telegraph battery is separated from the input E of the current regulating circuit IK. The diode D2 is again conductive and the center MT of the telegraph battery is connected to the input E of the current regulating circuit IK. Therefore, the described starting conditions have again been reached.

By selecting a suitable Zener diode, the voltage threshold value Ur is contrived to be such that the second voltage half −TB (−60 V) is connected before the current regulating circuit has overshot the regulation range.

Figure 3:
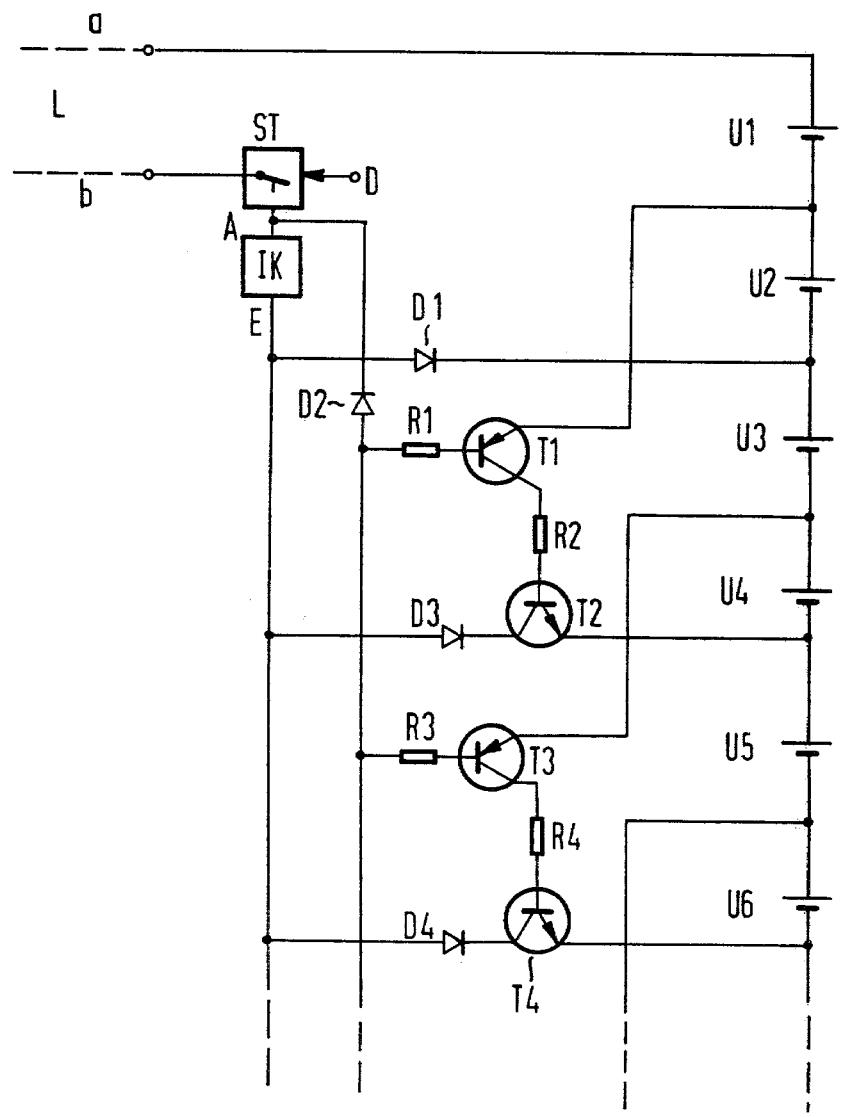
FIG. 3 illustrates a further advantageous exemplary embodiment of an electronic d.c. telegraph transmitter comprising multi-stage voltage switch-over facilities.

FIG. 3 illustrates another advantageous exemplary embodiment of an electronic d.c. telegraph transmitter featuring single current keying facilities and multi-stage voltage transfer facilities.

The transmitting circuit comprises the known transmitting keying circuit ST and the current regulating circuit IK. The switching stage is constructed from the diodes D1 to D4 and the switching transistors T1 to T4. The telegraph voltage consists of the subvoltages U1 to U6. The connection line L will be assumed to be such that the smallest telegraph voltage is connected to the input E of the regulating circuit IK, namely the voltages U1+U2. The diode D1 is conductive and the switching transistors T1 to T4 occupy the blocked state. The diode D2 is blocked and decouples the transistor T1 from the line L. The subvoltage U2 is used as threshold value. As soon as the voltage at the output A of the current regulating circuit IK undershoots the value of the voltage U2, the transistor T1 is driven conductive and itself renders the switching transistor T2 conductive. In the conductive state, the transistor T2 connects the negative pole of the subvoltage U4 via the conductive diode D3 to the input E of the current regulating circuit IK. The diode D1 is then blocked and as a result the negative pole of the subvoltage U2 is decoupled from the input of the current regulating circuit. The current regulating circuit is supplied with a sum voltage composed of the subvoltage U1+U2+U3+U4. If the voltage at the output A of the regulating circuit IK now drops by the value of the subvoltage U4 which now forms the threshold value for a further transfer procedure, the transistors T3 and T4 become conductive. By way of the switching path of the transistor T4 and by way of the conductive diode D4 the negative pole of the subvoltage U6 is connected to the input E of the regulating circuit IK. The diode D3 decouples the transistor T2 from the input of the current regulating circuit.

If the relevant threshold values U4 and U2 are overshot, the input E of the current regulating circuit is switched back to a low subvoltage. The resistors R1, R2 and R3, R4 determine the base currents which the transistors require in the conductive states. The number of voltage transfers can be increased in arbitrary fashion. Each additional voltage transfer necessitates the components which are shown in FIG. 3, namely two switching transistors, one diode, two current limiting resistors and two further subvoltages. In the case of an additional voltage transfer in FIG. 3, the voltage threshold value which is to be additionally overshot would be formed by the subvoltage U6.

The exemplary embodiments illustrated in FIGS. 2 and 3 can be easily extended to a transmitter featuring double current keying. To this end, it is merely necessary for the modules connected to the wire b of the line L to be folded upwards homologously.

Although I have described my invention by reference to particular illustrative embodiments, many changes and modifications of the invention may become apparent to those skilled in the art without departing from the spirit and scope of the invention. I therefore intend to include within the spirit and scope of the invention all such changes and modifications as may reasonably and properly be included within the scope of my contribution to the art.

I claim:

1. A circuit arrangement for an electronic d.c. telegraph transmitter, comprising:
   first and second terminals for connection to a transmission line;
   a telegraph battery including a first pole connected to said first terminal, a second pole and a plurality of intermediate taps providing different voltages;
   a keying circuit including a control input for receiving keying signals, an output connected to said second terminal, and an input for receiving a voltage to be placed on the transmission line;
   a current regulator including an input for connection to said battery, an output connected to said input of said keying circuit, and operating to maintain a constant current to the transmission line; and
   switch means including a plurality of inputs connected to respective taps of said telegraph battery, an output connected to said input of said current regulator, a control input connected to said output of said current regulator, and threshold means connected to said control input and responsive to the voltage at said output of said current regulator to cause said switch means to switch through and directly connect a corresponding tap voltage.

2. A circuit arrangement for an electronic d.c. telegraph transmitter, comprising:
   first and second terminals for connection to a transmission line;
   a voltage source including a first pole connected to said first terminal, a second pole, and a plurality of taps providing different voltages;
   a keying circuit including a control input for receiving keying signals, an output connected to said second terminal, and an input for receiving a voltage to be placed on the transmission line;
   a current regulator including an input for connection to said voltage source, an output connected to said input of said keying circuit, and operating to maintain a constant current on the transmission line; and
   switch means including a plurality of inputs connected to respective taps of said voltage source, an output connected to said input of said current regulator, a control input connected to said output of said current regulator, and voltage sensing means connected to said control input and responsive to the voltage at said output of said current regulator to cause said switch means to switch through and directly connect a corresponding tap voltage.

3. A circuit arrangement for an electronic d.c. telegraph transmitter, comprising:
   a first terminal and a second terminal for connection to a transmission line;
   a voltage source including first pole connected to said first terminal, a second pole, and a plurality of taps providing different voltages;
   a keying circuit including a control input for receiving keying signals, an output connected to said second terminal, and an input for receiving a voltage to be placed on the transmission line;
   a current regulator including an input for connection to said voltage source, an output connected to said input of said keying circuit, and operating to maintain constant current on the transmission line; and
   switch means including a plurality of inputs connected to respective taps of said voltage source, an output connected to said input of said current regulator, a control input connected to said output of said current regulator, and voltage sensing means connected to said control input and responsive to the voltage at said output of said current regulator to cause said switch means to switch through a corresponding tap voltage, said switch means comprising
- a coupling element connected between the lowest tap voltage and said input of said current regulator,
- a threshold value stage, including a resistor and a Zener diode in series therewith connected between said first terminal and a first voltage tap,
- a diode connected to said output of said current regulator,
- a first transistor including a collector an emitter connected to the junction of said resistor and Zener diode, and a base connected to said diode, and responsive to the voltage at said output of said current regulator exceeding the voltage at said junction to become conductive, and
- a second transistor including an emitter connected to another voltage output of said voltage source, a collector connected to said input of said current regulator and a base connected to said collector of said first transistor, said second transistor driven conductive in response to conduction of said first transistor.

4. A circuit arrangement for an electronic d.c. telegraph transmitter, comprising:
- a first terminal and a second terminal for connection to a transmission line;
- a voltage source including a first pole connected to said first terminal, a second pole, and a plurality of taps providing different voltages;
- a keying circuit including a control input for receiving keying signals, an output connected to said second terminal, and an input for receiving a voltage to be placed on the transmission line;
- a current regulator including an input for connection to said voltage source, an output connected to said input of said keying circuit, and operating to maintain constant current on the transmission line; and
- switch means including a plurality of inputs connected to respective taps of said voltage source, an output connected to said input of said current regulator, a control input connected to said output of said current regulator, and voltage sensing means connected to said control input and responsive to the voltage at said output of said current regulator to cause said switch means to switch through a corresponding tap voltage, wherein alternate ones of said taps carry different voltages which constitute a series of reference voltages which increase with respect to the voltage at said first pole, and wherein said switching means comprises
- a first diode, as a stage, connected between said input of said current regulator and the tap which carries the lower reference voltage,
- a second diode connected to said output of said current regulator,
- a plurality of switching stages each including a third diode and first and second transistors,
- each of said transistors including a base connected to said second diode, a collector and an emitter;
- said third diode connecting said collector of said second transistor to said input of said current regulator,
- said collector of said first transistor connected to a tap between a respective pair of reference voltage taps,
- said emitter of said second transistor connected to a respective reference voltage tap other than the lowest reference voltage tap,
- said collector of said first transistor connected to said base of said second transistor, and
- said base of said first transistor connected to said second diode,
- each of said first transistors rendered conductive to drive the respective second transistor conductive in response to the voltage at said output of said current regulator passing the reference voltage of the next lower referenced stage, and said first and third diodes decoupling the respective stages upon activation of higher-referenced stages.

* * * * *